United States Patent [19]

Somogyi

[11] 3,994,564

[45] Nov. 30, 1976

[54] LIGHT PIPE REFLECTOR FOR USE IN LIQUID CRYSTAL OR OTHER DISPLAY

[75] Inventor: Bela Somogyi, Costa Mesa, Calif.

[73] Assignee: Hughes Aircraft Company, Culver City, Calif.

[22] Filed: Mar. 31, 1975

[21] Appl. No.: 563,928

[52] U.S. Cl. .................... 350/160 LC; 240/1 EL; 350/96 R
[51] Int. Cl.² ........................................ G02F 1/13
[58] Field of Search ............ 240/1 EL; 350/160 LC, 350/96 R

[56] References Cited

UNITED STATES PATENTS

| | | | |
|---|---|---|---|
| 2,561,885 | 7/1951 | Prideaux et al. | 240/1 EL X |
| 3,023,304 | 2/1962 | Peterson | 240/1 EL |
| 3,752,974 | 8/1973 | Baker et al. | 240/1 EL |
| 3,840,695 | 10/1975 | Fischer | 350/160 LC X |
| 3,864,905 | 2/1975 | Richardson | 58/50 R |
| 3,881,809 | 5/1975 | Fergason et al. | 350/160 LC |

*Primary Examiner*—Edward S. Bauer
*Attorney, Agent, or Firm*—John M May; W. H. MacAllister

[57] ABSTRACT

The invention disclosed pertains to liquid crystal and other optical displays useable both with ambient light and with built-in illumination sources. A light pipe formed of optically clear material has a clear, lightly etched top surface, and a patterned bottom surface (preferably having closely spaced minute convex protrusions). An enlarged portion at one edge contains a cavity for the insertion of a light bulb. The light pipe is covered with a highly reflective coating except for said clear top surface and the interior portion of said cavity.

9 Claims, 5 Drawing Figures

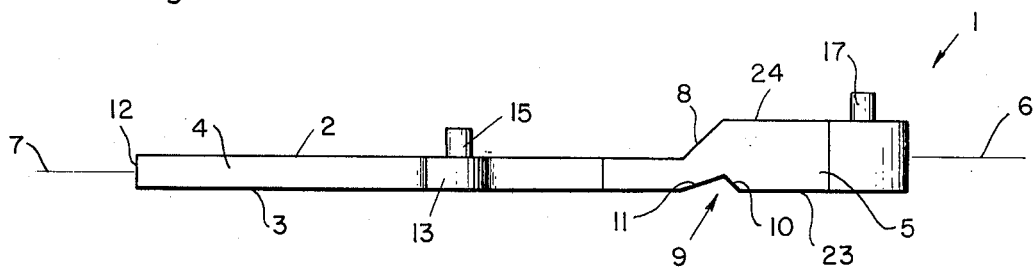
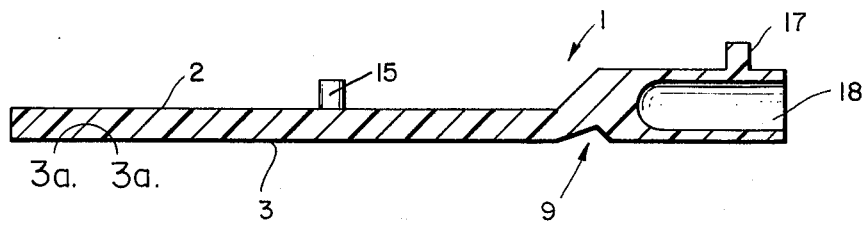
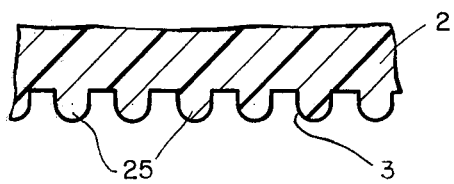
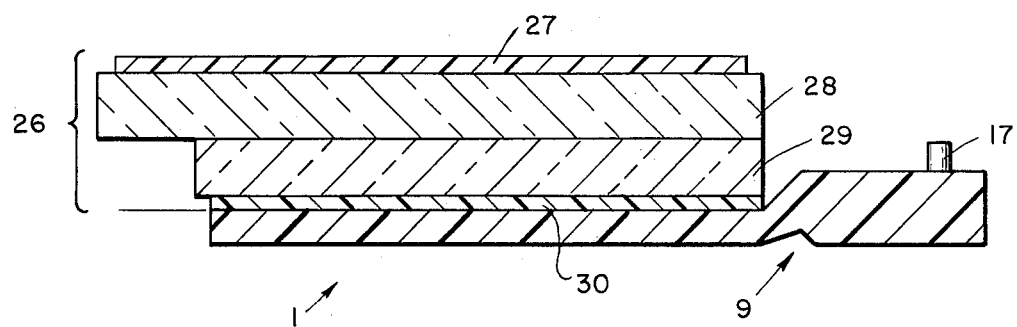

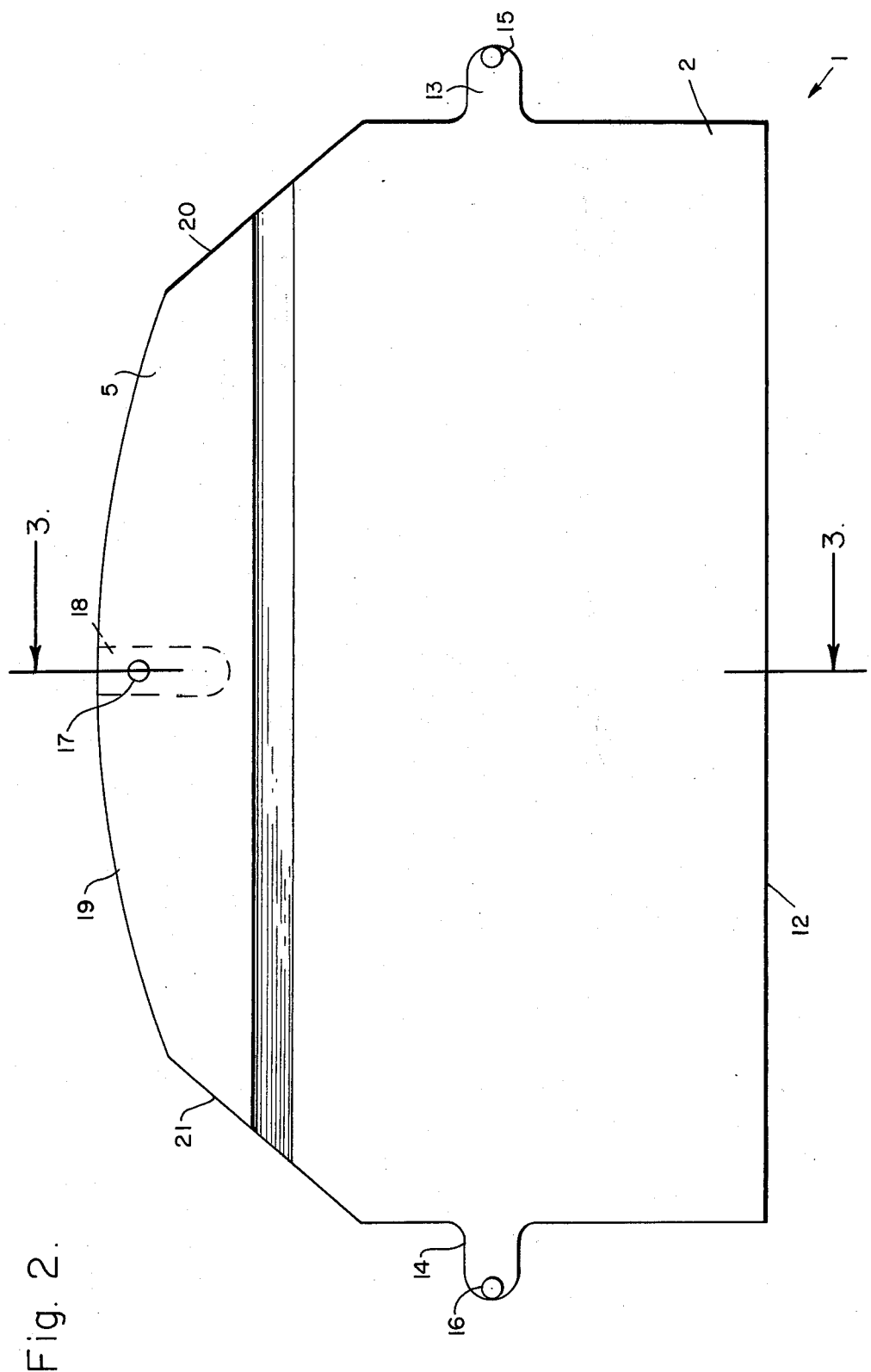

3,994,564

LIGHT PIPE REFLECTOR FOR USE IN LIQUID CRYSTAL OR OTHER DISPLAY

CROSS REFERENCE

A particular application of the present invention is illustrated in copending application Ser. No. 563,927, filed Mar. 31, 1975, Roger A. Burke et al., inventors, which copending application is assigned to the same assignee as is the present application and is incorporated herein by reference.

BACKGROUND OF THE INVENTION

This invention relates generally to liquid crystal displays and in particular to such displays provided with a uniform reflective (background for use when the display is to be used under ambient light conditions) which also contain a built-in source of illumination for viewing the display when the ambient light is insufficient.

U.S. Pat. No. 3,748,018 in the name of Howard C. Borden, Jr., discloses a universal transmission reflectance mode liquid crystal display having a reflector 32 as well as a built-in light source 36 arranged such that its light may be directed to the rear of the display package by means of a mirror 48; however Borden's display is not particularly compact and therefore is not adaptable for use in miniaturized consumer products such as wristwatches and portable calculators.

In U.S. Pat. No. 2,646,637 in the name of R. N. Nierenberg et al entitled "Device For Transilluminating Transparencies," there is illustrated an arrangement wherein a plurality of wedges having light piping properties are used to provide a relatively uniform source of illumination for back-lighting a transparency, a back reflector 15 being employed as a light intensifier. By using at least two such wedges, there is a proported improvement in the uniform distribution of the light; however the device disclosed is not particularly suitable for use with liquid crystal displays and furthermore requires at least two separate light sources be provided. It might also be pointed out that the embodiment of FIG. 6, even though provided with a back reflector, would not permit the reflective mode operation of say, a field effect liquid crystal cell provided with polarizers under typical indoor lighting conditions, inasmuch as most of the light passing through the display would not be reflected back towards the observer by the back reflector but would be generally diffused by the highly roughened surfaces 12 and 12a. In a dynamic scattering liquid crystal display, the situation would be even worse, inasmuch as these roughened surfaces would uniformly scatter all of the light reflected back to the observer, thereby greatly reducing the contrast of the display.

Accordingly, one object of the present invention is to provide a liquid crystal display having built-in illumination.

Another object of the present invention is to provide such a display which is sufficiently compact to be utilizable in a wristwatch or other small portable device.

Yet another object of the present invention is to provide a liquid crystal display with built-in illumination in such a manner that the display can also be used with ambient lighting.

Still another object of the present invention is to provide a light pipe for use in a liquid crystal display which is of a configuration that can easily be mass-produced.

A particular object of the present invention is to provide a combination light pipe/reflector for use with a field effect liquid crystal or other display such that said display may be used either with a built-in illumination source or with ambient room-lighting.

Briefly, the invention which accomplishes these and other objects comprises in its preferred embodiment a light pipe formed of plexiglass or other similar optically clear material having a clear, lightly etched top surface, a patterned bottom surface preferably having closely spaced minute convex protrusions, and an enlarged portion at one edge containing a cavity for the insertion of a light bulb. Reflective surfaces covering the major portion of the external surface of said light pipe may direct the bulk of the light emitted from said bulb to the region located between said top and bottom surfaces.

In the particular embodiment described, the enlarged portion of said light pipe has its transverse axis slightly displaced but parallel to the transverse axis of the region defined by said top and bottom surfaces and is provided with additional sloping and notch shaped reflective surfaces in order to cause the light emitted from said bulb to enter said region in a direction more normal to said surfaces.

BRIEF DESCRIPTION OF THE DRAWINGS

The invention will now be described in reference to the accompanying drawings in which:

FIG. 1 is a side elevation of a light pipe in accordance with the present invention;

FIG. 2 is a top elevation of the light pipe of FIG. 1;

FIG. 3 is a cross-section through FIG. 2 at the point indicated;

FIG. 3a is an enlarged view of the bottom surface of FIG. 3 at the point indicated; and FIG. 4 is another section through the light pipe of FIG. 2 in its usual position beneath a liquid crystal display cell (also shown in cross-section).

DETAILED DESCRIPTION

Referring now with greater particularity to FIGS. 1 and 2, it may be seen that, in one preferred embodiment of the present invention, there is provided a light pipe (indicated generally by the reference numeral 1) having a top surface 2 and a bottom surface 3 generally parallel to said top surface, said surfaces together defining an illuminating region 4. Also provided at one edge of light pipe 1 is an enlarged portion 5 which is designed to accommodate a miniature incandescent bulb or other light source (not shown). In the embodiment illustrated, the centerline 6 of said enlarged portion is off set relative to the centerline 7 of illuminating portion 4. These two portions are connected by means of an angled sloping face 8 set at an angle of approximately 50 degrees with respect to the normal. The lower surface of enlarged portion 5 although co-planar with lower surface 3 is separated therefrom by an angled notch 9 having a first face 10 set at an angle of approximately 45° and a second surface 11 set at an angle of approximately 15°.

Sloping surface 8 and notch 9 coact to cause the light from the light source to bounce back and forth many times between upper surface 2 and lower surface 3 before it finally reaches opposite end 12. The light pipe is also provided with extensions 13 and 14 having locating lugs 15 and 16 respectively on their upper surfaces.

Enlarged portion 5 is also equipped with a third locating lug 17. A cavity 18 (see also FIG. 3) is provided inside enlarged portion 5 into which a light bulb may be inserted.

Referring now with particularity to FIG. 2, it may be seen that the enlarged portion has a semi-circular (or possibly parabolic) edge 19 extended by means of angled portions 20 and 21.

Edge 19, angled portions 20 and 21, as well as edge 12 and lower surface 3 are all provided with a suitable reflective coating, as may be the upper and lower surfaces 22 and 23 respectively of enlarged portion 5. The purpose of this reflective coating is to contain the light within the body of the light pipe except for that which exits through the top surface 2. The reflective coating may be applied in a known manner, by, for example, vapor deposition of an aluminum film.

Referring now to FIG. 3 which is a cross section at the point indicated on FIG. 2, it should be noted that upper surface 2 is preferably slightly roughened in order to facilitate the emission of light through said upper surface. This roughening may be accomplished by means of light rubbing with very fine steel wool or, if the light pipe is cast, it can be accomplished by suitably roughening the corresponding surface of the mold with a suitably course grade of grinding compound. Lower surface 3, on the other hand, is provided with a minute series of convexities 25 (see FIG. 3a) which serve as cats' eyes and improve the performance of the liquid crystal device, especially when it is used in the reflective mode. These convexities are preferably provided by means of electrode discharge machining the corresponding portion of the mold. This will result in many small craters of from about 3 to about 5 mills in diameter on the mold surface. By way of comparison, the finish on top surface 2 is such as to result in approximately half to 1 mill deep grooves spaced apart at a distance of from about 7 to 10 mills. Although these grooves may be randomly ordered, I have found it preferable to arrange them perpendicular to the plane of section FIG. 3.

Referring now with particularity to FIG. 4 which is another cross section of the light pipe of FIG. 2 in use with a field effect liquid crystal display cell, it may be seen that light pipe 1 may be located beneath a liquid crystal cell 26 comprising an upper polarizer film 27, an upper substrate assembly 28, a lower substrate assembly 29, and a lower polarizer film 30. Not visible in the figure is a layer of liquid crystal material disposed between upper substrate 28 and lower substrate 29 as well as the required transparent electrode assemblies on the opposing surfaces of said substrates to cause various indicia such as the segments of a numerical type display to be visible.

In operation, ambient room light coming from the general direction of the top of FIG. 4 passes through polarizer film 27 and is thereby polarized. In those areas of the liquid crystal film which are not subject to electric field, the direction of polarization is rotated by approximately 90° (utilizing the "twisted neumatic field effect"). Lower polarizer film 30 has its direction of polarization rotated approximately 90 degrees relative to the direction of polarization of film 27 thereby permitting this light to exit the cell and enter the light pipe assembly through transparent upper surface 2 through region 4 down to patterned reflective surface 3. Inasmuch as surface 3 is covered with a reflective metallic coating, the direction of polarization is not altered but the light is reflected upwards back through lower polarizer 30, its direction of polarization is again rotated by the liquid crystal film, and it exits back towards the viewer through upper film 27 thereby creating a bright background.

Should the ambient room lighting not be adequate to provide the required sufficiently bright background, a bulb contained in cavity 18 is illuminated causing light to travel throughout the light pipe assembly 1 bouncing back and forth within the body of said assembly (due to both internal reflections and the fact that most of the surfaces of the light pipe are coated with reflective protective coatings) thence to the light pipe through transparent upper surface 2.

It should be emphasized that said surface has been lightly scratched thereby reducing the amount of the light which is prevented from exiting the light pipe on account of internal reflections. The light so exiting the light pipe passes through lower polarizer 30, has its direction of polarization rotated by approximately 90° in those areas of the liquid crystal which are not subject to electric film, and exits in the general direction of the viewer through upper polarizer film 27.

Thus it may be seen that a bright background providing a high contrast display is afforded by the use of the light pipe of the present invention in combination with a twisted nematic field effect liquid crystal cell (or other suitable optical display). The light source may be ambient lighting (for instance overhead lights in the room) or an incadescent light bulb or other built-in light source provided as part of the display assembly.

Although the invention has been described in detail with reference to preferred embodiment thereof, modifications and improvements which may be required for a particular application will doubtless be obvious to those skilled in the display art.

What I claim is:

1. A liquid crystal display useable either with an illumination source or with ambient lighting comprising:

a liquid crystal cell;

a light pipe assembly disposed beneath said cell, said assembly comprising a body of optically clear material having:

an enlarged portion disposed at one edge thereof said enlarged portion having an upper reflective surface, a lower reflective surface, and at least one edge reflective surface;

a thin portion having a reflective lower surface substantially coplanar with the lower surface of said enlarged portion, at least one reflective edge surface, and an upper illuminating surface adapted to allow bidirectional passage of light therethrough; and a coupling portion for coupling said enlarged portion and said thin portion comprising an upper reflective sloping surface joining said upper surfaces of said enlarged and said thin portions, a lower notch region between said lower coplanar surfaces having an angled reflective front surface antiparallel to said coplanar lower surfaces of said body, and a rear connective surface, said angled reflective front surface interposed beneath said reflective upper sloped surface and positioned to reflect light from said upper sloped surface into said thin light pipe region; and means for causing light from said illumination source to enter said enlarged portion for passing into said thin portion of said light pipe.

2. The display of claim 1 wherein said means for causing light to enter said enlarged portion is built into said assembly and comprises a cavity contained within said enlarged portion suitable for the insertion of an incadescent light bulb.

3. The light pipe of claim 2 wherein the edge of said enlarged portion has a reflective coating and is of such a shape as to evenly distribute the light from said illumination source throughout the remainder of said body.

4. The display of claim 3 wherein said shape comprises a rounded portion and a linear portion disposed at either end of said rounded portion.

5. The display of claim 1 wherein the lower surface of said thin portion comprises a plurality of closely spaced minute convex protrusions covered with a reflective coating.

6. The display of claim 1 wherein said upper illuminating surface of said thin portion is substantially parallel to the direction of light propagation through the light pipe and is slightly roughened to facilitate emission of light from the interior of said thin portion through said upper illuminating surface.

7. The display of claim 1 wherein said upper illuminating surface of said thin portion is substantially parallel to the direction of light propagation through said light pipe, said surface having therein a plurality of grooves to facilitate emission of light from the interior of said thin portion through said upper illuminating surface.

8. The display of claim 7 wherein the grooves are arranged substantially perpendicular to the direction of light propagation through the light pipe assembly.

9. A light pipe/reflector for use in a display device incorporating an illuminating source comprising:
a body of optically clear material having:
an enlarged portion disposed at one edge thereof said enlarged portion having an upper reflective surface, a lower reflective surface, and at least one edge reflective surface;
a thin portion having a reflective lower surface substantially coplanar with the lower surface of said enlarged portion, at least one reflective edge surface, and an upper illuminating surface adapted to allow bidirectional passage of light therethrough; and
a coupling portion for coupling said enlarged portion and said thin portion comprising an upper reflective sloping surface joining said upper surfaces of said enlarged and said thin portions, a lower notch region between said lower coplanar surfaces having an angled reflective front surface antiparallel to said coplanar lower surfaces of said body, and a rear connective surface, said angled reflective front surface interposed beneath said reflective upper sloped surface and positioned to reflect light from said upper sloped surface into said thin light pipe region; and
means for causing light from said illumination source to enter said enlarged portion for passing into said thin portion of said light pipe.

* * * * *